May 3, 1966 P. K. TRIMBLE 3,248,951
BALANCING SYSTEM
Filed Dec. 5, 1962 2 Sheets-Sheet 1

INVENTOR.
Philip K. Trimble
BY
Hugh L. Fisher
ATTORNEY

May 3, 1966
P. K. TRIMBLE
3,248,951
BALANCING SYSTEM
Filed Dec. 5, 1962
2 Sheets-Sheet 2
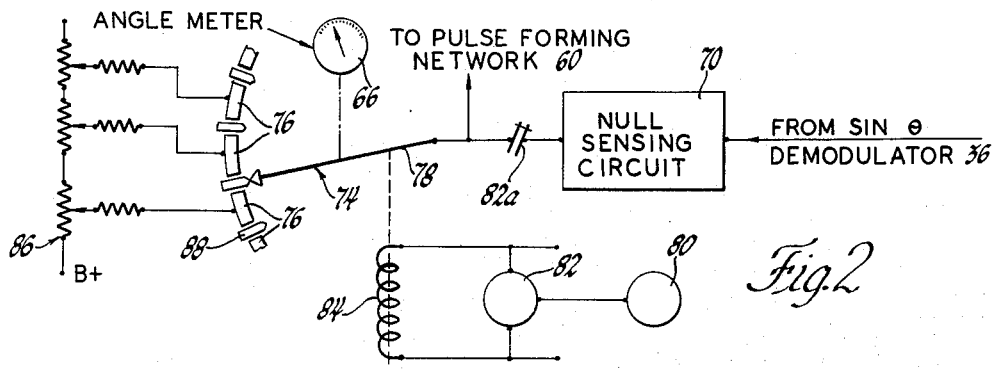
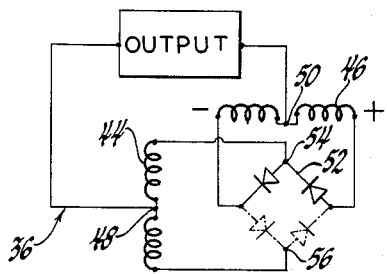
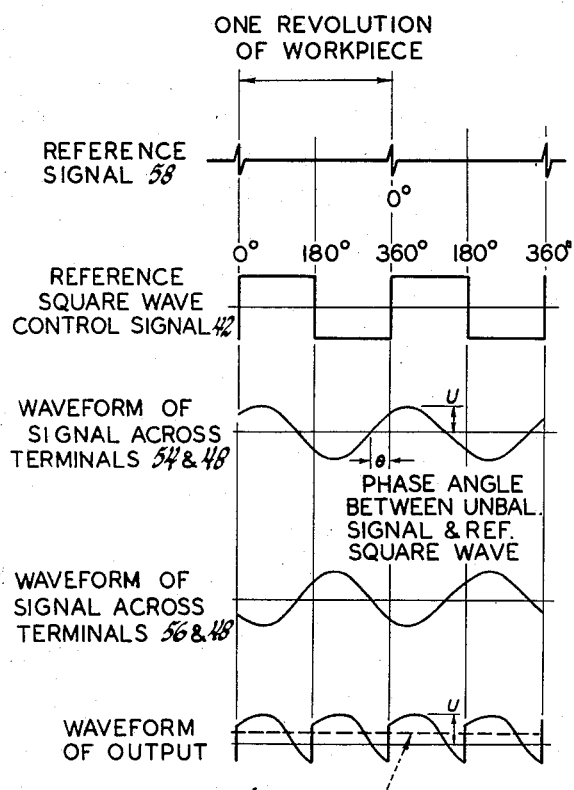
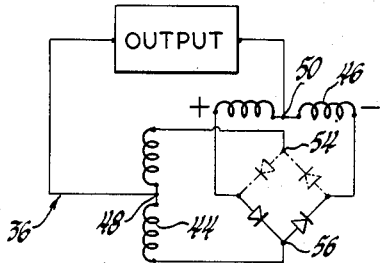
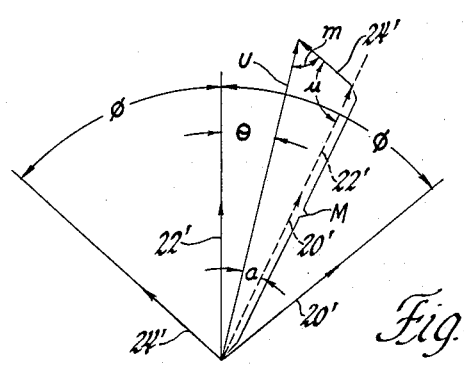
INVENTOR.
Philip K. Trimble
BY
Hugh L. Fisher
ATTORNEY

United States Patent Office 3,248,951
Patented May 3, 1966

3,248,951
BALANCING SYSTEM
Philip K. Trimble, Rochester, Mich., assignor to General Motors Corporation, Detroit, Mich., a corporation of Delaware
Filed Dec. 5, 1962, Ser. No. 242,501
18 Claims. (Cl. 73—462)

This invention relates to method and apparatus for balancing workpieces. The invention further relates both to improvements in electrical controls adapted for use, although not exclusively, in balancing systems, and a control for converting a single electrical effect into a series of equivalent component electrical effects.

Very often the design characteristics of a certain workpiece make unbalance corrections difficult, if not virtually impossible. For example, the intended function of the workpiece may preclude the addition of material such as a weight for correction purposes. Therefore, it is necessary to remove material, but this requirement can be further complicated if the configuration of the workpiece demands that either the material be removed only at certain points or that material can be removed only to a certain depth, or both. An example of such a workpiece would be a multi-segment rotor of some type. Usually the segments are equally spaced and extend radially outwardly from a hub. If the unbalance correction is to be made by drilling only into the segments and only to a certain maximum depth, then it can be appreciated that two or more drills may be required for some corrections. If, additionally, the angle of the unbalance occurs between two segments, the drilling must be done in the nearest segment in such a way that the resultant balance correction is equivalent to that obtained by actually correcting at the point of unbalance.

Various solutions are available to the foregoing problem. These include the redesign of the workpiece so as to add or redistribute material. The balance correction planes can be changed, for often the corrections can be made in the hub of the workpiece so as to at least reduce the amount of unbalance. In extreme cases, a balancer of some suitable type can be incorporated in the drive line into which the workpiece is installed. It can be appreciated that each of these solutions represents at most a compromise.

Another problem is time. Often it is necessary to make several small corrections rather than one large one in order to conserve time. Where to make several corrections that are equivalent to one large correction then becomes a concern.

Therefore, the purpose of the invention is to provide novel method and apparatus for quickly making plural unbalance corrections that are equivalent to a single balance correction. Further contemplated is the making of unbalance corrections at locations other than the actual location of the unbalance such that the correction is equivalent to that required to correct for unbalance at the actual location. More specifically, the novel method provides for measuring the amount of unbalance at its actual location in the workpiece, positioning the workpiece in a convenient correction position nearest to the actual location of the unbalance, and then rapidly making at this nearest correction position unbalance corrections that will be equivalent to correcting for the unbalance at the actual location thereof.

It is further proposed to provide a unique balancing system that enables a workpiece to be quickly and accurately balanced by making an unbalance correction at a location other than the location of the actual unbalance. Additionally, a system is proposed that can convert unbalance information into a form that in effect develops component vectors whose sum is equivalent to a vector that corresponds to the actual unbalance. These component vectors afford the necessary information for making unbalance corrections at locations other than the actual location of the unbalance, thus enabling the workpiece to be accurately balanced regardless of its shape or design requirements.

It is also proposed to provide a new and different control whereby a signal representing certain information is converted into a series of signals that afford equivalent information. In the control, the single signal is converted into outputs representing some trigonometric function of the phase angle variation between the single signal and the certain reference. These outputs are thereafter mathematically proportioned and then summed to provide a series of component signals that in effect provide a vector sum equivalent to the single signal. The mathematical proportioning recognizes and takes into consideration the polarity of the phase variations between the single signal and the reference.

The foregoing and other objects and advantages of the invention will be apparent from the following description and from the accompanying drawings in which:

FIGURE 2 is a circuit diagram showing the details of a clamping circuit employed in the FIGURE 1 system;

FIGURES 3a and 3b are circuit diagrams portraying different operating conditions for a demodulator used in the FIGURE 1 balancing system;

FIGURE 3c shows wave forms developed by the demodulator and during the operating conditions illustrated in FIGURES 3a and 3b; and FIGURE 4 is a vector diagram showing the resolution of an unbalance vector into component vectors.

Figure 1:
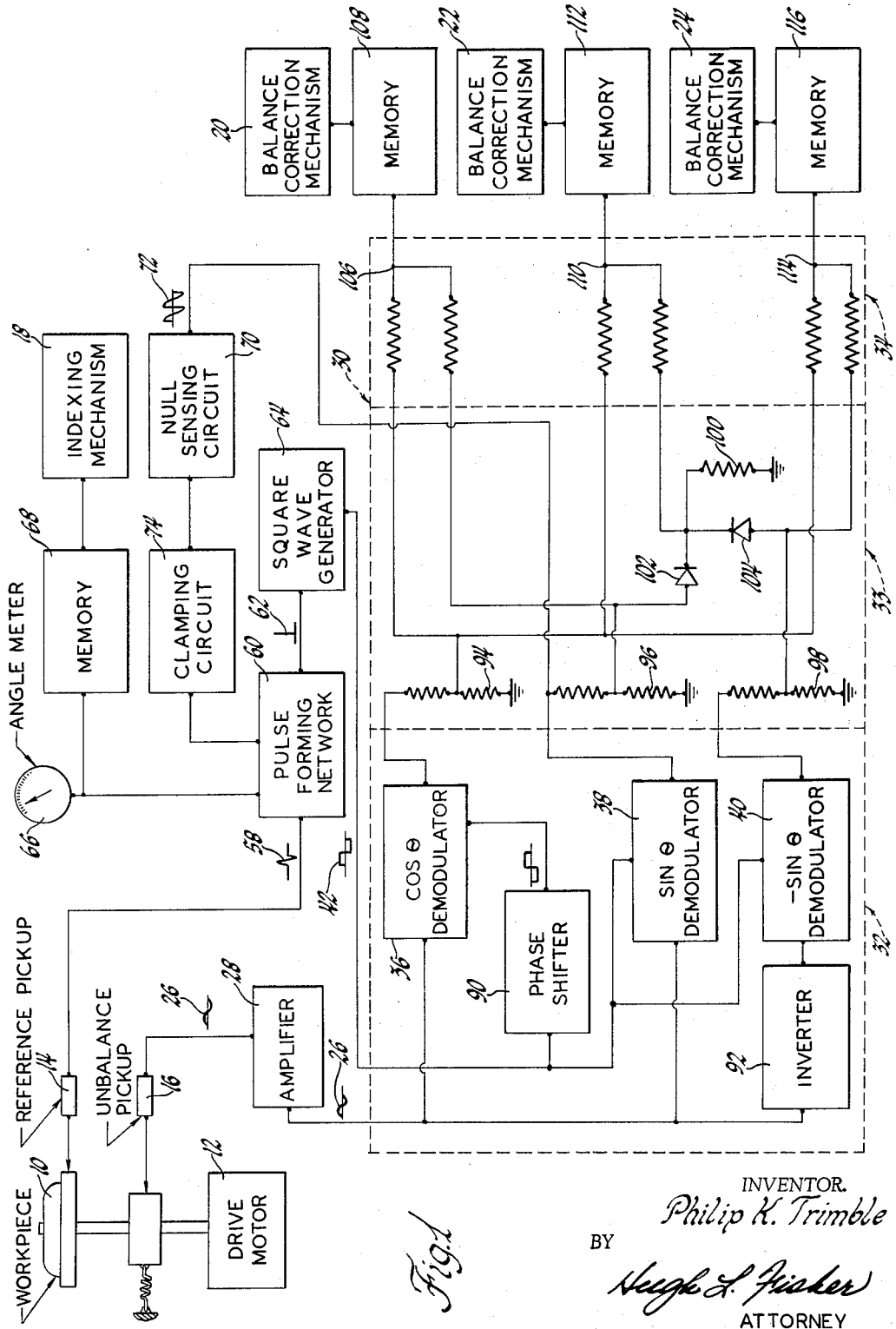
FIGURE 1 is a block diagram of a balancing system incorporating the principles of the invention.

Considering now the details of the FIGURE 1 balancing system, the numeral 10 designates a workpiece, which is to be dynamically balanced. The workpiece 10 is suitably mounted so that it can be revolved by a drive motor 12 at the proper speed for measuring the dynamic unbalance, if any. The information needed to measure both the amount of unbalance and the angular location of this unbalance is obtained from reference and unbalance pickups 14 and 16. This information is then used to operate both an indexing mechanism 18 and a series of balance correction mechanisms 20, 22, and 24. In operation, the indexing mechanism 18 properly aligns the workpiece 10 relative to the balance correction mechanisms 20, 22, and 24. Thereafter, the balance correction mechanisms 20, 22, and 24 correct for the unbalance in the workpiece by either adding or removing material.

Continuing to refer to FIGURE 1, the unbalance pickup 16, which may be of any known type, e.g., magnetic or capacitive, is so positioned relative to the workpiece 10 and the drive motor 12 as to develop an unbalance signal 26. The unbalance signal 26 is of a sinusoidal wave form and usually includes various spurious signals due to noise and other background effects. If the unbalance signal 26 is too weak, an amplifier 28 can be included in the FIGURE 1 system for increasing the unbalance signal 26 to a more usable level.

After the unbalance signal 26 is amplified, it is fed to a conversion network denoted generally by the numeral 30. The conversion network 30 comprises a detector or demodulator section 32, a voltage divider section 33, and a summing section 34.

As can be observed in FIGURE 1, the detector section 32 includes a cosine $\theta$ demodulator, a sine $\theta$ demodulator 38, and a minus sine $\theta$ demodulator 40. The demodulators are of a known type such as disclosed in the U.S. patent to King 2,988,918 and function in the customary way to rectify or chop the unbalance signal in synchronism with some reference, in this instance a reference square wave control signal 42. This synchronous rectifying action affords beneficial filtering since the average output from all even harmonics is zero and that from all odd harmonics is greatly reduced. This synchronous rectifying action can be better understood by referring at this points to FIGURES 3a, 3b and 3c. If, for example, the cosine θ demodulator 36 is considered to be the bridge type illustrated in FIGURES 3a and 3b, the unbalance signal 26 will be applied to one input winding 44 and the reference square wave control signal 42 will be supplied to another winding 46. The output from the demodulator 36 is taken across the center terminals 48 and 50 of these windings 44 and 46. With the windings 44 and 46 connected across a diode bridge circuit 52, as illustrated, and with the reference square wave control signal 42 going positive, conduction will be around the solid line path veiwed in FIGURE 3a. On the other hand, when the reference square wave control signal 42 is going negative, conduction will be around the solid line path portrayed in FIGURE 3b. Consequently, the wave forms of the unbalance signal appearing across a bridge terminal 54 and the center terminal 48, and across a bridge terminal 56 and the center terminal 48, will be as indicated in FIGURE 3c. As can be observed, these two wave forms are 180° out of phase. Therefore, the wave form of the output will be as illustrated and have an average level equal to U cosine θ, where θ is the phase angle between the unbalance signal 26 and the reference square wave control signal 42 and U is the amplitude of the unbalance signal 26.

Briefly summarizing the operation of the demodulator 36, when the square wave control signal 42 is positive, conduction will be as seen in FIGURE 3a. When the reference square wave control signal 42 goes negative, conduction occurs as depicted in FIGURE 3b. Hence, the output has the wave form of the unbalance signal appearing across the bridge terminal 54 and the center terminal 48 when the reference square wave control signal 42 is positive or during the first one-half of the cycle and the wave form of the unbalance signal across the bridge terminal 56 and the center terminal 48 when the reference square wave control signal 42 is negative or during the other half cycle. By varying the phase angle θ in a manner to be discussed, the average voltage level of the output can be varied; in fact, a null can be produced when and if the unbalance signal 26 and the reference square wave control signal 42 are 90° out of phase.

The generation of the reference square wave control signal 42 commences at the reference pickup 14. The reference pickup 14 may be of the same kind as the unbalance pickup 16 and cooperates with the workpiece 10 to develop a reference signal 58 having a frequency corresponding to the rotational speed of the workpiece 10. This is achieved by having the reference pickup 14 responsive to a reference point on the workpiece 10, e.g., a hole or a magnetic slug, so that a corresponding reference signal 58 as depicted in FIGURE 3c will be developed each time this reference point passes the reference pickup 14. The reference signal 58 formed in this manner is then supplied to a pulse forming network 60, shown in FIGURE 1. The function of the pulse forming network 60 is to develop a trigger pulse 62 for operating a square wave generator 64. The square wave generator 64 in a way well known produces the square wave control signal 42, which has the same phase and the same frequency as the trigger pulse 26.

Since the square wave control signal 42 and the unbalance signal 26 are only in phase if the actual unbalance occurs at the reference point, which rarely happens, the unbalance can be accurately located by comparing the phases of these two signals. In the FIGURE 1 system, this comparison is made and thereafter the reference signal 58 is in effect shifted until it corresponds in phase with the unbalance signal 26. Actually, as has been mentioned, to obtain a null output the signals 26 and 58 must be 90° out of phase. The proper calibrations and compensations can easily be made in many well known ways for this 90° phase difference. Of course, the unbalance signal 26 could be shifted until it was phase related with the reference signal; however, a greater accuracy can be achieved by shifting the reference signal 58 as can be appreciated. The amount of this phase shift then corresponds to the actual angular location of the unbalance relative to the aforementioned reference point and can be visually shown on an angle meter 66 as well as stored in a suitable memory 68. When needed, this information can be used to operate the indexing mechanism 18 so as to revolve the workpiece 10 to the proper aligning setting relative to the different balance correction mechanisms 20, 22 and 24.

The shifting of the reference signal 58 in phase is done in pulse forming network 60 under the control of a null sensing circuit 70. The null sensing circuit 70 has its input connected to the output of the sine θ demodulator 38 and will produce an output of whatever average D.C. level is required by the pulse forming network 60 to shift the reference signal 58 until it is 90° out of phase with the unbalance signal 26. At this time, an output signal 72 that has a null average level will be produced.

The aforementioned parts of the FIGURE 1 balancing system including the pulse forming network 60, the null sensing circuit 70, the memory 68, and the sine θ demodulator 38 are all described in greater detail in the application U.S. Serial No. 242,500, filed December 5, 1962. Reference may be made to this application for these details. For an understanding of this invention, however, these details are not necessary.

The system as so far described is suitable for automatically balancing a workpiece 10 having, e.g., a continuous periphery, such that material can be added or removed at the exact point of unbalance by any one of the balance correction mechanisms 20, 22 or 24. If the workpiece 10 does not have a continuous periphery, but in fact is formed with a series of equispaced blades or segments, obviously a single correction cannot be made if the unbalance occurs between these segments or if limitations prevent adding or removing material entirely from one segment.

This problem is overcome by a clamping circuit 74 as will become more apparent. The clamping circuit 74 is interposed between the null sensing circuit 70 and the pulse forming network 60 and is of the nature described in the aforementioned application. In this embodiment, the clamping circuit 74 includes a series of fixed contacts 76 and a movable contact 78 that is operatively joined to the angle meter 66. The number of fixed contacts will of course be determined by the number of points at which balance corrections can be made; for instance, if the workpiece 10 has seven spaced segments, at least seven fixed contacts 76 are required and each has a certain angular relationship to one of the segments. Eight fixed contacts are preferably used, with the first and eighth being tied together to provide for continuous operation.

To explain the operation of the clamping circuit 74 shown in detail in FIGURE 2, it is first assumed that the unbalance angle has been determined and is indicated on the angle meter 66. Next, it is assumed that this angular location causes the movable contacts 78 to be positioned opposite the first one of the fixed contact 76, thus indicating that the unbalance is occurring near the reference point and its location coincides with one of the segments. After a predetermined interval, adequate to permit the angle to be measured, a timer 80 will, after having timed out, operate a relay 82 and energize the clamping solenoid winding 84, thus shifting the movable contact 78 through an appropriate connection into clamping engagement with this first one of the fixed contacts 76. From a voltage divider network designated generally at 86, a voltage closely approximating that being developed by the null sensing circuit 70 at this time will be applied to the pulse forming network 60 and maintain the same phase relationship needed to establish the null. At this time, the relay 82 will have opened normally closed contacts 82a so that the output of the null sensing circuit 70 is disconnected from the pulse forming network 60. Therefore, only the voltage from the voltage divider network 86 is applied to the pulse forming network 60 and the unbalance correction can be made in the segment coinciding with the angular location of the unbalance.

The foregoing represents only one condition: If the unbalance occurs between the segments on the workpiece 10, such that the movable contact 78 is, e.g., situated between the first and second fixed contacts 76 after the measurement of the angle of unbalance has been made, it can be appreciated that for a correction to be made, the indexing mechanism 18 must revolve the workpiece 10 to the nearest segment. Hence, when the aforedescribed clamping occurs, a cam element 88 is interposed between adjacent fixed contacts 76 so as to coact with the wedge shaped movable contact 78 and force it to whichever position it tends to favor. Therefore, the voltage available at the fixed contact 76 engaged by the movable contact 78 will be applied to the pulse forming network 60, which in turn will shift the phase of the trigger signal 62 a corresponding amount and also cause the indexing mechanism 18 to revolve the workpiece 10 the additional angular amount required to align the correction mechanism with a segment. This additional angular amount is determined by the difference between the output voltage from the null sensing circuit 70 and the output voltage from the voltage divider 86. Of course, there will no longer be a null output from the sine $\theta$ demodulator 38, for it will now reflect the angular change due to the reference square wave control signal 42 being shifted in phase the amount needed to move the workpiece 10 to the correction position nearest to the actual angular location of the unbalance. This angle will hereinafter be referred to as angle $\theta$.

At this point it will be appreciated that if a certain corrective amount is required to correct for the unbalance at its actual location, the changing of the correction location will influence the amount of the correction. In addition, if the workpiece configuration or design requirements further complicate the correction such that the complete correction cannot be made in one segment, or if time requirements are very demanding, several correction operations must be made simultaneously. The embodiment displayed in the drawings does this.

To facilitate an understanding of how plural corrections are made, it will be assumed for demonstration purposes only that the three balance correction mechanisms 20, 22, and 24 correct for unbalance by drilling into adjacent segments. Also, it will be assumed that all of the segments are equally spaced; hence, the relative angular location of each of the three drill points can be accurately established.

Next, it is necessary to decide how much material is to be removed by each of the mechanisms 20, 22, and 24. This can be best described by referring to the FIGURE 4 vector diagram. In the FIGURE 4 diagram, the angle $\phi$ corresponds to the angular location of the drills in the mechanisms 20, 22, and 24, whereas the drill depths are designated by vectors with corresponding prime numbers, e.g., the mechanism 20 will have a drill depth equivalent to the length of vector 20'. With the vector U representing the actual amount of unbalance and its location relative to the nearest segment and with the arbitrary assumption that vectors 20' and 22' are equal, then by vector addition, the magnitude of the vector 24' can be ascertained. The following solution for the magnitudes of the vectors 20', 22', and 24' uses the same symbols as shown in the vector diagram. It should be kept in mind that the equal vectors 20' and 22' have a vector sum equal to M.

Considering the basic equation:

(1) $$\frac{U}{\sin u} = \frac{M}{\sin m} = \frac{\text{Vector } 24'}{\sin a}$$

and that:

(2) $$m = \theta + \phi$$

(3) $$u = 180° - \frac{3\phi}{2}$$

(4) $$a = \frac{\phi}{2} - \theta$$

then:

(5) $$\frac{M}{2} = \text{Vector } 22' \cos \frac{\phi}{2} = \text{Vector } 20' \cos \frac{\phi}{2}$$

therefore (6) $$\text{Vector } 22' = \frac{M}{2 \cos \frac{\phi}{2}}$$

and (7) $$\text{Vector } 20' = \frac{M}{2 \cos \frac{\phi}{2}}$$

using Equation 1 and substituting Equations 2 and 3 therein (8) $$M = U \frac{\sin m}{\sin u} = U \frac{\sin(\theta + \phi)}{\sin\left(180° - \frac{3\phi}{2}\right)}$$
$$= U \frac{\sin \theta \cos \phi + \cos \theta \sin \phi}{\sin \frac{3\phi}{2}}$$

Next, by substituting Equation 8 in Equations 6 and 7, it is determined that (when angle $\theta$ is positive)

(9) $$\text{Vector } 20' = \text{Vector } 22' = U\left(\frac{\cos \phi}{2 \cos \frac{\phi}{2} \sin \frac{3\phi}{2}} \sin \theta + \frac{\sin \phi}{2 \cos \frac{\phi}{2} \sin \frac{3\phi}{2}} \cos \theta\right)$$

Also, by substituting Equations 3 and 4 in Equation 1, then

(10) $$\text{Vector } 24' = U \frac{\sin a}{\sin u} = U \frac{\sin\left(\frac{\phi}{2} - \theta\right)}{\sin \frac{3\phi}{2}}$$

and accordingly

(11) $$\text{Vector } 24' = U \frac{\sin \frac{\phi}{2} \cos \theta}{\sin \frac{3\phi}{2}} - \frac{\cos \frac{\phi}{2} \sin \theta}{\sin \frac{3\phi}{2}}$$

Substitutions of the appropriate values in Equations 9 and 11 will provide the magnitudes respectively of the vectors 20' and 22' and the vector 24'.

With this understanding of the vector diagram in FIGURE 4, the operation of the conversion network 30 can be explained by using some actual values, which it should be understood are only exemplary and should not be construed as limiting. It will still be assumed that the workpiece 10 has seven segments and hence, the angle $\phi$ will be equivalent to one-seventh of 360° or 51.43°. When the appropriate values for the angle $\phi$ are substituted in Equations 9 and 11 and when the angle $\theta$ is positive,

(12) Vector $24' = U(.446 \cos \theta - .924 \sin \theta)$
(13) Vector $22' = U(.446 \cos \theta + .354 \sin \theta)$
and
(14) Vector $20' = U(.446 \cos \theta + .354 \sin \theta)$.

When the angle $\theta$ is negative, vector 24' equals vector 22'; therefore Equation 9 is used. Likewise, vector 20' for a negative angle $\theta$ is determined by Equation 11. When the angle of 51.43° is substituted for angle $\phi$,

(15) Vector $24' = U(.446 \cos \theta + .354 \sin \theta)$
(16) Vector $22' = U(.446 \cos \theta + .354 \sin \theta)$
and
(17) Vector $20' = U(.446 \cos \theta - .924 \sin \theta)$.

Considering now the conversion network 30 in detail and initially the detector section 32, the different demodulators 36, 38, and 40 all provide the proper trigonometric function of the angle $\theta$; for instance, the cosine $\theta$ demodulator 36 will synchronously rectify the unbalance signal 26 with a reference square wave control signal 42 that is $\theta$ degrees out of phase therewith. Consequently, the output voltage therefrom will correspond to the equation U cos $\theta$, where U is the amplitude of the unbalance signal 26 as has been mentioned.

To obtain the sine function of the angle $\theta$, different rectification is required, and therefore, the reference square wave control signal 42 applied to the cosine $\theta$ demodulator 36 is shifted 90° in phase by a phase shifter 90. The need for the phase shift is perhaps more easily explained by considering the situation where the angle $\theta$ is zero. At this time, the sine $\theta$ demodulator 38 will have a null output because the reference square wave control signal 42 is shifted so that the unbalance signal 26 is chopped 90° after the point of zero voltage. Now, if the reference square wave control signal 42 is shifted 90°, the unbalance signal 26 will be chopped 180° after the point of zero voltage, such that a full wave rectified output will be obtained from the cosine $\theta$ demodulator 36. Hence, the relationship between the outputs from the cosine $\theta$ demodulator 36 and the sine $\theta$ demodulator 38 are correct, for when the sine of an angle is zero, the cosine of that angle is unity, or maximum.

For the minus sine $\theta$ demodulator output to be correct, it must of course have a 180° difference in relationship with respect to the output from the plus sine $\theta$ demodulator 38 because, as is well known, at 90° the sine of $\theta$ is $+1$ and at 270° the sine of $\theta$ is $-1$. To introduce this 180° phase relationship, it is merely necessary to invert the unbalance signal 26 in an inverter 92 before applying it to the one input of the minus sine $\theta$ demodulator 40. Also, the same reference signal as applied to the sine $\theta$ demodulator 38 is used by the minus sine $\theta$ demodulator 40.

Referring back to the Equations 12 through 17, it can be appreciated that the values of U, the cosine $\theta$, and the sine $\theta$ are all provided in the detector section 32. It is also necessary to provide the mathematical ratios required by these equations. This is the function of the voltage dividing section 33, which furnishes the proper multipliers. In the section 33, a resistor 94 connected across the ouput of the cosine $\theta$ demodulator 36 affords the .446 multiplier, and resistors 96 and 98 across the outputs respectively of the sine $\theta$ demodulator 38, and the minus sine $\theta$ demodulator 40 furnish the .924 multiplier. A resistor 100 affords the .354 multiplier, whereas one-way conducting devices as diodes 102 and 104 provide the polarity correction needed when $\theta$ is positive or negative.

To explain the operation of the conversion network 30, $\theta$ will first be made positive. Therefore, the resistor 94 will introduce the .446 multiplier into the output from the cosine $\theta$ demodulator 36, which equals U cosine $\theta$. This proportional voltage, which corresponds to the first term of the Equation 14, is applied to a summing junction 106 in the summing section 34. The other term of the Equation 14 is provided by the sine $\theta$ demodulator 38. With the angle $\theta$ positive, the output from the sine $\theta$ demodulator 38 will be positive, whereas the output from the minus sine $\theta$ demodulator 40 will be negative. Consequently, the diode 102 will conduct and the resistor 100 will shunt the sine $\theta$ demodulator output from the .924 value determined by resistor 96 to the .354 value. This proportional voltage equivalent to .354 sine $\theta$ is also applied to the summing junction 106. The result of the algebraic addition by the summing section 34 will solve the Equation 17 and the corresponding information will be stored in a memory 108 for the balance correction mechanism 20.

Both the proportional voltages equivalent to .446 cosine $\theta$ and to .354 sine $\theta$ respectively derived from the outputs of the cosine $\theta$ demodulator 36, and the sine $\theta$ demodulator 38 are also applied to a summing junction 110. Hence, the solution to Equation 13 is retained in a memory 112 until needed by the balance correction mechanism 22. Since Equations 13 and 14 are identical, the same resultant voltage will be stored in both the memory 108 and the memory 112.

In solving Equation 12, the first term is still satisfied by the .446 cosine $\theta$ proportional voltage from the output of the cosine $\theta$ demodulator 36 and is applied to a summing junction 114. The output from the minus sine $\theta$ demodulator 40 is multiplied by the factor .924, this being the function of the resistor 98 and is supplied also to the summing junction 114. At this time, the diode 104 blocks any negative voltage, and therefore, the full $-.924$ sine $\theta$ proportional voltage is applied to the junction 114. These two proportional voltages are summed in the section 34 supplied to a memory 116.

When wanted, the information stored in the memories 108, 112, and 116 can be fed to the corresponding balance correction mechanism 20, 22, and 24. Each of these mechanisms 20, 22, and 24 then will drill to the depths established by the equations. Consequently, the equivalent correction is made in the workpiece 10, i.e., a correction equivalent to that required to correct for the actual unbalance at the actual location thereof.

If the angle $\theta$ is negative, the set of Equations 15, 16, and 17 must be satisfied. The output from the minus sine $\theta$ demodulator 40 is now positive, and hence, the diode 104 will conduct and cause the output from the minus sine $\theta$ demodulator 40 to be applied across the resistor 100 such that a proportional voltage of .354 sine $\theta$ is applied to both the summing junctions 110 and 114. The diode 102 blocks the negative output from the sine $\theta$ demodulator 38, and therefore, a proportional voltage of $-.924$ sine $\theta$ is applied to the summing junction 106. At the same junction 106 as well as the junctions 110 and 114, the proportional voltage of .446 cosine $\theta$ from the cosine $\theta$ demodulator 36 is still applied because, as is well known, the cosine $\theta$ equals the cosine of minus $\theta$. In this instance, i.e., with the angle $\theta$ negative, it will be noted from the Equations 15, 16 and 17 that vectors 22' and 24' are equal.

As has been mentioned, the foregoing examples used in describing the conversion network 30 are only exemplary. More or less than three corrections can be made by the method, material may be added instead of subtracted, the vectors may be other than 51.43° apart, and none of the vectors have to be equal. In other words, many variations and changes can be made, as will be apparent to those versed in the art, without deviating from the spirit of the invention. In fact, some sections of the conversion network 30 may not be needed for certain applications of the method. For example, if the angle $\theta$ is always zero, the contribution of the detector section 32 would not be demanded. Or, the voltage divider section 33 as such may not be necessary, particularly where its function can be served entirely by the detector section 32.

From the foregoing, it will be appreciated that by the invention, a method and apparatus are provided that permit automatic balance correction to be made in any type of workpiece 10 regardless of its shape or the particular design requirements. Even if the type of workpiece 10 presents no problem, plural and simultaneous balance corrections are possible by the invention so that the correction time can be greatly reduced. The correction made at permitted points and by adding or subtracting material in aceeptable amounts is always equivalent to making the correction at the exact location of the unbalance. This is done in a relatively simple way while utilizing many of the components needed by the system itself.

The invention is to be limited only by the following claims:

1. In apparatus for making unbalance corrections in a workpiece having only certain available locations where unbalance corrections can be made, the combination of unbalance correction means for making unbalance corrections in a certain plane in the workpiece, unbalance measuring means providing an unbalance signal corresponding to the amount and the angular disposition of the unbalance in the certain correction plane in the workpiece, and indexing means responsive to the unbalance signal for positioning the workpiece and the unbalance correction means relative to each other so that the unbalance correction can be made in the one of the available locations in the workpiece nearest to the actual angular disposition of the unbalance, means converting the unbalance signal into a series of component signals proportional in magnitude to the amplitude of corresponding component vectors having a predetermined angular relationship to each other and a vector sum equivalent to the unbalance in the workpiece, the unbalance correction means being operative in response to the series of component signals to make the unbalance correction in amounts determined by each of the series of component signals so that the resultant correction at the one of the available locations will correspond to that required to correct for the unbalance represented by the unbalance signal and the actual angular disposition thereof.

2. In apparatus for making unbalance corrections in a workpiece having only certain available locations where unbalance corrections can be made; the combination of unbalance correction means for making unbalance corrections in a certain plane in the workpiece; unbalance measuring means providing an unbalance signal corresponding to the amount and the angular disposition of the unbalance in the certain correction plane in the workpieces; indexing means responsive to the unbalance signal for positioning the workpiece and the unbalance correction means in a relative position with respect to each other so that the unbalance correction can be made in the one of the available locations nearest to the actual angular disposition of the unbalance; and means converting the unbalance signal into a series of component signals proportional in magnitude to the amplitude of corresponding component vectors having a predetermined angular relationship to each other and a vector sum equivalent to the unbalance in the workpiece; the converting means including means detecting the proportional angular phase variation between the relative position and the disposition of the unbalance and developing a plurality of corresponding outputs therefrom and means producing the series of component signals from the outputs; the unbalance correction means being operative in response to the series of component signals to make the unbalance correction in amounts determined by each of the series of component signals so that the resultant correction at the one of the available locations will correspond to that required to correct for the unbalance represented by the unbalance signal and the actual angular disposition thereof.

3. In apparatus for making unbalance corrections in a workpiece having only certain available locations where unbalance corrections can be made; the combination of unbalance correction means for making unbalance corrections in a certain plane in the workpiece; unbalance measuring means providing an unbalance signal corresponding to the amount and the angular disposition of the unbalance in the workpiece; indexing means responsive to the unbalance signal for positioning the workpiece and the unbalance correction means in a relative position so that the unbalance corrections can be made in the adjacent available locations nearest to the actual angular disposition of the unbalance; and means converting the unbalance signal into a series of component signals proportional in magnitude to the amplitude of corresponding component vectors having a predetermined angular relationship determined by the angular relationship between the adjacent available locations on the workpiece and a vector sum equivalent to the unbalance in the workpiece; the converting means including means detecting the proportional angular phase variation between the relative position and the disposition of the unbalance and developing a plurality of corresponding sine and cosine related outputs, means introducing predetermined mathematical proportions to the outputs for producing proportional signals from the outputs, and means summing the proportional signals and producing therefrom the series of component signals; the unbalance correction means being operative in response to the series of component signals to make the unbalance corrections at the adjacent available locations nearest to the actual angular disposition of the unbalance and in amounts determined by each of the series of component signals so that the resultant correction at the adjacent available locations nearest to the actual angular disposition of the unbalance will correspond to that required to correct for the unbalance represented by the unbalance signal and the actual angular disposition thereof.

4. In apparatus for making unbalance corrections in a workpiece having only certain available locations where unbalance corrections can be made; the combination of unbalance correction means for making unbalance corrections in a certain plane in the workpiece; unbalance measuring means providing an unbalance signal corresponding to the amount and the angular disposition of the unbalance in the workpiece; indexing means responsive to the unbalance signal for positioning the workpiece and the unbalance correction means in a relative position so that the unbalance corrections can be made in the adjacent available locations nearest to the actual angular disposition of the unbalance; and means converting the unbalance signal into a series of component signals proportional in magnitude to the amplitude of corresponding component vectors having a predetermined angular relationship to each other determined by the angular relationship between the adjacent locations on the workpiece and a vector sum equivalent to the unbalance in the workpiece; the converting means including a plurality of demodulators each arranged to synchronously rectify the unbalance signal in accordance with a reference signal that reflects the difference angle between the relative position and the actual angular disposition of the unbalance; means altering the phase of certain of the signals to predetermined ones of the plurality of demodulators so as to cause the plurality of demodulators to respectively develop outputs representing the sine and cosine functions of the difference angle, a voltage divider network for providing signals proportional to the outputs in accordance with certain mathematical characteristics of the component vectors, and means summing the proportional outputs from the voltage divider network and developing therefrom the series of component signals; the unbalance correction means being operative in response to the series of component signals to make the unbalance corrections at the available locations nearest to the actual angular disposition of the unbalance and in amounts determined by each of the series of component signals so that the resultant correction at the available locations nearest to the actual angular disposition of the unbalance will correspond to that required to correct for the total unbalance represented by the unbalance signal and the actual angular disposition thereof.

5. In apparatus for making unbalance corrections in a workpiece having only certain equiangularly spaced available locations where unbalance locations can be made; the combination of unbalance correction means for making unbalance corrections in a certain plane in the workpiece; unbalance measuring means providing an unbalance signal corresponding to the amount and the angular disposition of the unbalance in the workpiece; indexing means responsive to the unbalance signal for positioning the workpiece and the unbalance correction means in a relative position so that the unbalance corrections can be made in the adjacent available locations nearest to the angular disposition of the unbalance; and means converting the unbalance signal into at least three component signals proportional in magnitude to the amplitude of corresponding component vectors having a predetermined angular relationship to each other determined by the angular relationship between adjacent available locations on the workpiece and a vector sum equivalent to the unbalance in the workpiece; the converting means including three demodulators each arranged to synchronously rectify the unbalance signal in accordance with a reference signal reflecting the difference angle between the relative position established by the indexing means and the actual angular disposition of the unbalance, means altering the phase of certain of the signals to predetermined ones of the three demodulators so as to cause the demodulators to respectively develop outputs representing the cosine, the sine and the —sine functions of the difference angle, a voltage divider network for introducing predetermined mathematical proportions into the outputs and thereby developing proportional signals, the voltage divider network including polarity sensitive means correcting the proportional signals for the polarity of the difference angle, and means summing the proportional signals and producing therefrom the series of component signals; the unbalance correction means being operative in response to the series of component signals to make the unbalance corrections in a single plane at the available locations nearest to the actual angular disposition of the unbalance and in amounts determined by each of the series of component signals so that the resultant correction at the available locations nearest to the actual angular disposition of the unbalance will correspond to that required to correct for the unbalance represented by the unbalance signal and the actual angular disposition thereof.

6. Means converting a single electrical signal into at least three component electrical signals of a magnitude proportional to the amplitude of corresponding component vectors having a predetermined angular relationship to each other and a vector sum corresponding to the single electrical signal comprising means detecting phase variations between the single electrical signal and a predetermined reference and developing therefrom corresponding outputs representing the sine and the cosine functions of the phase angle variation, a voltage divider network introducing predetermined mathematical proportions into the outputs for developing proportional signals from the outputs, and means summing the proportional outputs and developing therefrom the series of component signals.

7. Means converting a single electrical signal into a series of component electrical signals of a magnitude proportional to the amplitude of corresponding component vectors having a predetermined angular relationship to each other and a vector sum equivalent to the single electrical signal comprising means detecting phase angle variations between the single electrical signal and a predetermined reference and developing a plurality of corresponding outputs each representing a certain trigonometric function of the phase angle variation, a voltage divider network for introducing predetermined mathematical proportions to the outputs thereby developing proportional signals, the voltage divider network including polarity sensitive rectifiers for correcting the proportional signals for the polarity of the phase angle variation, means summing the proportional signals and developing therefrom the series of component signals.

8. Means converting an electrical signal into at least three component electrical signals of a magnitude proportional to the amplitude of corresponding component vectors having a predetermined angular relationship to each other and a vector sum equivalent to the single electrical signal comprising a plurality of demodulators each arranged to synchronously rectify the single electrical signal in accordance with a reference signal having a certain phase angle relationship to the single electrical signal, means altering the phase of certain of the signals to predetermined ones of the plurality of demodulators so as to cause the plurality of demodulators to respectively develop outputs representing the sine, the cosine and the —sine functions of the phase angle, a voltage divider network introducing predetermined mathematical proportions to the outputs so as to develop corresponding proportional signals, and means summing the proportional signals and developing therefrom the series of component signals.

9. Means converting a single electrical signal into three component electrical signals of a magnitude proportional to the amplitude of corresponding component vectors having a predetermined angular relationship to each other and a vector sum equivalent to the single electrical signal comprising three demodulators each arranged to synchronously rectify the single electrical signal in accordance with a reference signal having a certain phase angle relationship to the single electrical signal, means altering the phase of certain of the signals to predetermined ones of the three demodulators so as to cause the demodulators to respectively develop outputs representing the cosine, the sine and the —sine functions of the phase angle relationship, a voltage divider network for mathematically proportioning the outputs to thereby develop proportional signals, the voltage divider means including polarity sensitive rectifiers for correcting the proportional signals for the polarity of the certain phase angle relationship, and means summing the proportional signals and developing therefrom the series of component signals.

10. In combination; unbalance measuring means providing an unbalance signal corresponding to the amount and the angular disposition of the unbalance in a workpiece having only certain available locations thereon where unbalance corrections can be made; means converting the unbalance signal into a series of component signals whose vector sum corresponds to the unbalance signal; unbalance correction means for making plural unbalance corrections in a certain correction plane in the workpiece and at the available locations; the workpiece and the unbalance correction means being arranged so as to be maneuverable relative to each other over a 360° range and to a series of unbalance correction positions in each of which the unbalance correction means and the workpiece are so aligned that plural unbalance corrections can be made at one of the available locations on the workpiece; and means responsive to the unbalance signal for maneuvering the workpiece and the unbalance correction means relative to each other and to the one of the series of unbalance correction positions that permits the unbalance corrections to be made at the available location nearest to the actual angular disposition of the unbalance; the unbalance correction means being operatives in response to the series of component signals to make each of the plural unbalance corrections at a corresponding one of the adjacent available locations and in an amount determined by a corresponding one of the series of component signals so that the resultant correction will correspond to that required to correct for the unbalance represented by the unbalance signal.

11. In combination; unbalance measuring means providing an unbalance signal corresponding to the amount and the angular disposition of the unbalance in a workpiece having only certain available locations thereon where unbalance corrections can be made; means converting the unbalance signal into a series of component signals whose vector sum corresponds to the unbalance signal; the converting means including means dividing the unbalance signal into the series of component signals; unbalance correction means for making plural unbalance corrections in a certain correction plane in the workpiece and at the available locations; the workpiece and the unbalance correction means being arranged so as to be maneuverable relative to each other and to a series of unbalance correction positions in each of which the unbalance correction means and the workpiece are so aligned so that the plural unbalance corrections can be made at more than one of the available locations on the workpiece; and means responsive to the unbalance signal for maneuvering the workpiece and the unbalance correction means relative to each other and to the one of the series of unbalance correction positions that permits the plural unbalance corrections to be made at the adjacent available locations nearest to the actual angular disposition of the unbalance; the unbalance correction means being operative in response to the series of component signals to make each of the plural unbalance corrections at a corresponding one of the adjacent available locations and in an amount determined by a corresponding one of the series of component signals so that the resultant correction will correspond to that required to correct for the unbalance represented by the unbalance signal.

12. In combination; unbalance measuring means providing an unbalance signal corresponding to the amount and the angular disposition of the unbalance in a workpiece having only certain available locations thereon where the unbalance correction can be made; means converting the unbalance signal into a series of compenent signals whose vector sum in a certain correction plane corresponds to the unbalance signal; the converting means including means detecting phase angle variations in the unbalance signal from a predetermined reference and developing the series of compenent signals of a corresponding level; unbalance correction means for making plural unbalance corrections in the certain correction plane and at the available locations in the workpiece; the workpiece and the unbalance correction means being arranged so as to be maneuverable relative to each other and to a series of relative unbalance correction positions in each of which the unbalance correction means and the workpiece are so aligned that the plural unbalance corrections can be made at more than one of the available locations on the workpiece; and means responsive to the unbalance signal for maneuvering the workpiece and the unbalance correction means relative to each other and to the one of the series of correction positions that permits the unbalance corrections to be made at the adjacent available locations nearest to the actual angular disposition of the unbalance; the unbalance correction means being operative in response to the series of component signals to make each of the plural unbalance corrections at a corresponding one of the adjacent available locations and in an amount determined by a corresponding one of the series of component signals so that the resultant correction will correspond to that required to correct for the unbalance represented by the unbalance signal.

13. In combination; unbalance measuring means providing an unbalance signal corresponding to the amount and the angular disposition of the unbalance in a certain correction plane in a workpiece having only certain available locations thereon where unbalance corrections can be made; means converting the unbalance signal into a series of component signals whose vector sum corresponds to the unbalance signal; the converting means including means detecting phase angle variations in the unbalance signal from a predetermined reference and developing a plurality of corresponding outputs and means producing the series of component signals from the outputs; unbalance correction means for making plural unbalance corrections in the certain correction plane; the workpiece and the unbalance correction means being arranged so as to be maneuverable relative to each other over a 360° range and to a series of unbalance correction positions in each of which the unbalance correction means and the workpiece are so aligned that plural unbalance corrections can be made at more than one of the available locations on the workpiece; and means responsive to the unbalance signal for maneuvering the workpiece and the unbalance correction means relative to each other and to the one of the series of correction positions that permits the unbalance corrections to be made at the adjacent available locations nearest to the actual angular disposition of the unbalance; the unbalance correction means being operative in response to the series of component signals for making each of the plural unbalance corrections at a corresponding one of the adjacent available locations and in an amount determined by a corresponding one of the series of compenent signals so that the resultant correction will correspond to that required to correct for the unbalance represented by the unbalance signal.

14. In combination; unbalance measuring means providing an unbalance signal corresponding to the amount and the angular disposition of the unbalance in a workpiece having only certain available loctaions thereon where unbalance corrections can be made; means converting the unbalance signal into a series of compenents of a magnitude proportional to the amplitude of corresponding component vectors having a predetermined angular relationship to each other determined by the angular relationship betwen adjacent available locations on the workpiece and a vector sum correpsonding to the unbalance signal; the converting means including means detecing phase angle variatibns in the unbalance signal from a predetermined reference and developing a plurality of corresponding outputs representing the sine and the cosine functions of the phase angle variation, voltage divider means introducing predetermined mathematical proportions to the outputs for developing proportional signals from the outputs, and means summing the proportional signals and producing therefrom the series of component signals; unbalance correction means for making plural unbalance corrections in a certain correction plane and at the available locations; the workpiece and the unbalance correction means being arranged so as to be maneuverable relative to each other and to a series of unbalance correction positions in each of which the unbalance correction means and the workpiece are so aligned that the plural unbalance corrections can be made at more than one of the available locations on the workpiece; and means responsive to the unbalance signal for maneuvering the workpiece and the unbalance correction means relative to each other and to the one of the series of unbalance correction positions that permits the plural unbalance corrections to be made at the adjacent available locations nearest to the actual angular position of the unbalance; the unbalance correction means being operative in response to the series of component signals for making each of the plural unbalance corrections at a corresponding one of the adjacent available locations and in an amount determined by a corresponding one of the series of component signals so that the resultant correction will correspond to that required to correct for the unbalance represented by the unbalance signal.

15. In combination; unbalance measuring means providing an unbalance signal corresponding to the amount and the angular disposition of the unbalance in a workpiece having only certain available locations thereon where unbalance corrections can be made; means converting the unbalance signal into a series of component signals of a magnitude proportional to the amplitude of corresponding compenent vectors having a predetermined angular relationship to each other and a vector sum corresponding to the unbalance signals; the converting means including a plurality of demodulators each arranged to synchronously rectify the unbalance signal in accordance with a certain reference signal, means altering the phase of certain of the signals to predetermined ones of the plurality of demodulators so as to cause the plurality of demodulators to respectively develop outputs representing the cosine, the sine and the —sine functions of the phase angle variation, a voltage dividing network introducing predetermined mathematical proportions to the outputs for developing proportional signals from the outputs according to certain desired characteristics of the series of component signals, the voltage divider network including polarity sensitive means correcting the proportional signals for the polarity of the phase angle variations between the signals, and means summing the proportional signals from the voltage dividing network and producing therefrom the series of component signals; unbalance correction means for making plural unbalance corrections in a certain correction plane in the workpiece and at the available locations; the workpiece and the unbalance correction means being arranged so as to be maneuverable relative to each other and to a series of unbalance correction positions in each of which plural unbalance corrections can be made at more than one of the adjacent available locations on the workpiece; and means responsive to the unbalance signal for causing the workpiece and the unbalance correction means to be maneuvered relative to each other and to the one of the series of unbalance correction positions that permits the plural unbalance corrections to be made at the adjacent available locations nearest to the actual angular disposition of the unbalance; the unbalance correction means being operative in response to the series of component signals for making each of the plural unbalance corrections at the corresponding one of the adjacent available locations in an amount determined by a corresponding one of the series of component signals so that the resultant correction will correspond to that required to correct for the unbalance represented by the unbalance signal.

16. In combination; unbalance measuring means providing an unbalance signal corresponding to the amount and the angular disposition of the unbalance in a workpiece having only certain equiangular spaced available locations thereon where unbalance corrections can be made; means converting the unbalance signal into at least three component signals of a magnitude proportional to the amplitude of corresponding component vectors having a predetermined angular relationship to each other determined by the equiangular spacing of the available locations and a vector sum corresponding to the unbalance signal; the converting means including a plurality of demodulators each arranged to synchronously rectify the unbalance signal in accordance with a reference signal having a certain phase angle relationship to the unbalance signal, means altering the phase of certain of the signals to predetermined ones of the plurality of demodulators so as to cause the plurality of demodulators to respectively develop outputs representing the cosine, the sine and the —sine functions of the phase angle, a voltage divider network for introducing predetermined mathematical proportions into the output and thereby developing proportional signals, and means summing the proportional signals and developing therefrom the series of component signals; unbalance correction means for making three unbalance corrections in a certain correction plane in the workpiece and at three adjacent available locations; the workpiece and the unbalance correction means being so arranged as to be maneuverable relative to each other over a 360° range and to a series of unbalance correction positions in each of which the unbalance correction means and the workpiece are so aligned that the plural unbalance corrections can be made in three adjacent available locations on the workpiece; and means responsive to the unbalance signal for causing the workpiece and the unbalance correction means to be maneuvered relative to each other and to the one of the series of relative unbalance correction positions that permits the three unbalance corrections to be made in the adjacent three available locations nearest to the actual angular position of the unbalance, the unbalance correction means being operative in response to the series of component signals for making each of the three unbalance corrections at a corresponding one of the adjacent three available locations and in an amount determined by a corresponding one of the series of component signals so that the resultant correction will correspond to that required to correct for the unbalance represented by the unbalance signal.

17. In combination; unbalance measuring means providing an unbalance signal corresponding to the amount and the angular disposition of the unbalance in a workpiece having only certain avialable locations thereon where unbalance corrections can be made; means converting the unbalance signal into a series of component signals whose vector sum corresponds to the unbalance signal; the converting means including means detecting phase angle variations between the unbalance signal and a predetermined reference signal and developing corresponding outputs representing respectively the cosine, the sine and the —sine functions of the phase angle variation, a voltage divider network introducing predetermined mathematical proportions to the outputs for developing proportional signals from the outputs, the voltage divider network including polarity sensitive means correcting the proportional signals for the polarity of the phase angle variations between the unbalance signal and the predetermined reference signal, and means summing the proportional signals and developing therefrom the series of component signals; unbalance correction means for making plural unbalance corrections in a certain correction plane in the workpiece and at the available locations; the workpiece and the unbalance correction means being arranged so as to be maneuverable relative to each other over a 360° range and to a series of unbalance correction positions in each of which the unbalance correction means and the workpiece are so aligned that the plural unbalance corrections can be made in more than one of the adjacent available locations on the workpiece; and means responsive to the unbalance signal for maneuvering the workpiece and the unbalance correction means relative to each other and to the one of the series of relative correction positions that permits the unbalance correction to be made at the adjacent available locations nearest to the actual angular disposition of the unbalance; the unbalance correction means being operative in response to the series of component signals for making each of the plural unbalance corrections at a corresponding one of the adjacent available locations and in an amount determined by a corresponding one of the series of component signals so that the resultant correction will correspond to that required to correct for the unbalance represented by the unbalance signal.

18. A method of measuring the unbalance in a workpiece having only certain equiangularly spaced available locations thereon for making unbalance corrections comprising the steps of measuring the amount and the angular location of the unbalance in the workpiece and developing a corresponding electrical unbalance signal, positioning the workpiece and an unbalance correction mechanism relative to each other in accordance with the unbalance signal so that the unbalance correction can be made at the adjacent available locations nearest to the actual location of the unbalance, converting the electrical unbalance signal into a series of component signals that are proportional in magnitude to the amplitude of corresponding component vectors having an angular relationship to each other in a certain correction plane corresponding to the equiangular spacing between the adjacent available locations on the workpiece and a vector sum corresponding to the unbalance in the workpiece, and correcting the unbalance in the certain correction plane in amounts at each of the adjacent available locations determined by a corresponding one of the series of component signals so that the resultant correction at the adjacent available locations will correspond to that required to correct the unbalance at the actual location thereof.

References Cited by the Examiner

UNITED STATES PATENTS

| | | | |
|---|---|---|---|
| 2,108,624 | 2/1938 | Thearle | 73—455 |
| 2,331,733 | 10/1943 | Senger | 73—463 X |
| 2,706,399 | 4/1955 | Federn | 73—463 |
| 2,722,830 | 11/1955 | Federn et al. | 73—463 |
| 2,783,649 | 3/1957 | Hope | 73—464 |
| 2,870,960 | 1/1959 | Richardson | 235—189 |
| 2,872,819 | 2/1959 | King | 73—462 |
| 2,919,581 | 1/1960 | Lash | 73—462 |
| 2,922,578 | 1/1960 | Davidson | 235—189 |
| 2,980,331 | 4/1961 | Gruber | 235—189 |
| 3,091,125 | 5/1963 | Budnick | 73—462 |
| 3,159,059 | 12/1964 | Fibikar et al. | 77—5 |

FOREIGN PATENTS 642,916 9/1950 Great Britain.

OTHER REFERENCES

A pamphlet, "Methods and Facilities for Practical Dynamic Balance" by Federn et al, 48 pages, page 16, published by Carl Schenck Maschinenfabrik, 1957.

RICHARD C. QUEISSER, *Primary Examiner.*

JAMES J. GILL, *Examiner.*